UNITED STATES PATENT OFFICE.

SAMUEL GROSSIORD, OF MOUSSIERES, FRANCE.

PROCESS OF OBTAINING ARTIFICIAL PRECIOUS STONES.

SPECIFICATION forming part of Letters Patent No. 280,467, dated July 3, 1883.

Application filed March 6, 1883. (No specimens.) Patented in France October 25, 1882, No. 151,732.

*To all whom it may concern:*

Be it known that I, SAMUEL GROSSIORD, a citizen of the Republic of France, residing at Moussieres, in the Republic of France, have invented certain new and useful Improvements in the Process of Obtaining Artificial Precious Stones, (for which I have obtained Letters Patent in France, dated the 25th day of October, 1882, No. 151,732, and in no other country;) and I do hereby declare that the following is a full, clear, and exact description of the invention, which will enable others skilled in the art to make and use the same.

The object of this invention is to obtain imitation precious stones—generally known under the name of "diamondines" and "sapphire," "ruby," &c., diamondines according to their color—of greater brilliancy and of better imitation than those obtained by the methods heretofore resorted to.

In carrying out my invention I employ strass either for that part of the brilliant above the setting or for that part below the setting, to which is fused a section of enamel of the proper color. For instance, if that portion of the brilliant above the setting is of enamel and the portion below the setting of strass, or vice versa, I employ both substances in equal proportions—that is to say, one half of the stone is strass and one half thereof enamel, caused to adhere to each other by fusion.

The depth of color may be regulated within certain limits by the operation of cutting in utilizing more of one than the other of either of the two substances.

The brilliancy and depth of color may be varied by a variation in the relative proportions of the two substances. For instance, the greatest brilliancy and less depth of color is obtained by forming the whole of the upper part and one half of the under side of the stone of white strass—*i. e.*, strass not colored—and the other half of its under side of enamel of the desired color, and then cutting the stone in the desired form.

Having thus described my invention, what I claim, and desire to secure by Letters Patent of the United States, is—

1. The herein-described process of obtaining imitation precious stones, which consists in forming the same of uncolored strass and an enamel of the desired color, substantially as described.

2. The herein-described process of obtaining imitation precious stones and of regulating the depth of color thereof, which consists in forming the same of uncolored strass and an enamel of the desired color, and then utilizing in the cutting of the stone more or less of one or the other substance, substantially as and for the purposes specified.

3. The herein-described process of varying the brilliancy and depth of color of imitation precious stones, composed partly of uncolored strass and partly of a colored enamel, which consists in varying the relative proportion or volume of the two substances, substantially as and for the purposes specified.

4. An imitation precious stone, composed partly of uncolored strass and partly of a colored enamel, made integral by fusing the one to the other, substantially as and for the purposes specified.

In testimony that I claim the foregoing I have hereunto set my hand.

SAM. GROSSIORD.

Witnesses:
 CELESTIN DAVID,
 P. CHEVASSEY.